(12) United States Patent
Lee

(10) Patent No.: US 12,742,652 B2
(45) Date of Patent: Sep. 22, 2026

(54) VEHICLE NAVIGATION DEVICE AND METHOD FOR CONTROLLING SAME

(71) Applicants: Hyundai Motor Company, Seoul (KR); Kia Corporation, Seoul (KR)

(72) Inventor: Gyu Young Lee, Yongin-Si (KR)

(73) Assignees: Hyundai Motor Company, Seoul (KR); Kia Corporation, Seoul (KR)

(*) Notice: Subject to any disclaimer, the term of this patent is extended or adjusted under 35 U.S.C. 154(b) by 57 days.

(21) Appl. No.: 18/884,899

(22) Filed: Sep. 13, 2024

(65) Prior Publication Data

US 2025/0264338 A1 Aug. 21, 2025

(30) Foreign Application Priority Data

Feb. 19, 2024 (KR) ........................ 10-2024-0023742

(51) Int. Cl.
*G01C 21/36* (2006.01)

(52) U.S. Cl.
CPC ................................ *G01C 21/3682* (2013.01)

(58) Field of Classification Search
CPC ............ G01C 21/3682; G01C 21/3697; G06Q 30/0266; G06Q 30/0267
See application file for complete search history.

(56) References Cited

U.S. PATENT DOCUMENTS 8,660,894 B2 * 2/2014 O'Sullivan ........ G01C 21/3476 705/14.62
2002/0032035 A1 * 3/2002 Teshima .................. H04W 4/21 455/566
2003/0046158 A1 * 3/2003 Kratky ................... G06Q 30/02 705/14.62
2007/0083428 A1 * 4/2007 Goldstein .......... G06Q 30/0269 705/14.62
2008/0021639 A1 * 1/2008 Inukai .................... G01C 21/34 701/533
2008/0281516 A1 * 11/2008 Cummings ........ G01C 21/3697 705/14.69
2010/0332315 A1 * 12/2010 Kamar .............. G06Q 30/0254 705/14.46
2011/0137741 A1 * 6/2011 Omer ..................... G06Q 30/02 705/26.1

(Continued)

*Primary Examiner* — Calvin Cheung
(74) *Attorney, Agent, or Firm* — MORGAN, LEWIS & BOCKIUS LLP

(57) ABSTRACT

In a vehicle navigation device and a method for controlling the same, and more particularly, to a vehicle navigation device and a method for controlling the same, the vehicle navigation device displays advertising data corresponding to each of multiple pieces of route data to a user, enabling the user to select a traveling route suitable for the user's plan to use an affiliated store. The method for controlling a navigation device may include: obtaining a destination; obtaining route information related to at least one route based on predetermined criteria from a current location to the destination; obtaining route-specific advertising information based on the route information; matching each of the at least one route with corresponding route-specific advertising information and outputting the matched route-specific advertising information; and in case that one of the at least one route is selected, performing route guidance for the selected route.

20 Claims, 5 Drawing Sheets

(56) References Cited

U.S. PATENT DOCUMENTS

| | | | | |
|---|---|---|---|---|
| 2011/0320275 | A1* | 12/2011 | O'Sullivan | G06Q 30/0255 705/14.66 |
| 2012/0197690 | A1* | 8/2012 | Agulnek | G06Q 30/0261 705/14.1 |
| 2012/0221413 | A1* | 8/2012 | Alberth | G06Q 30/02 705/14.58 |
| 2013/0054315 | A1* | 2/2013 | Shutter | G06Q 30/02 705/14.1 |
| 2013/0339076 | A1* | 12/2013 | Baranda | G06Q 10/047 705/7.17 |
| 2014/0006160 | A1* | 1/2014 | McDevitt | G06Q 30/0259 705/14.57 |
| 2015/0241225 | A1* | 8/2015 | Liu | G08G 1/0968 701/540 |
| 2019/0120654 | A1* | 4/2019 | Todasco | G01C 21/3476 |

* cited by examiner

VEHICLE NAVIGATION DEVICE AND METHOD FOR CONTROLLING SAME

CROSS-REFERENCE TO RELATED APPLICATION(S)

The present application claims priority to Korean Patent Application No. 10-2024-0023742, filed on Feb. 19, 2024, the entire contents of which is incorporated herein for all purposes by this reference.

BACKGROUND OF THE PRESENT DISCLOSURE

Field of the Present Disclosure

The present disclosure relates to a vehicle navigation device and a method for controlling the same, and more particularly, to a vehicle navigation device and a method for controlling the same, wherein the vehicle navigation device displays advertising data corresponding to each of multiple pieces of route data to a user, enabling the user to select a traveling route suitable for the user's plan to use an affiliated store.

Description of Related Art

A navigation device provided in a vehicle utilizes information received from Global Positioning System (GPS) satellites to show the current location and traveling direction of the vehicle on a display device, and when a destination is input, display and provide a road, a distance, and an estimated time for vehicle traveling on a screen based on the current location.

This route display function utilizes real-time traffic information to provide more optimized route information, and also provides a multimedia content playback function. With users spending more time in vehicles, navigation devices have recently been used to provide features that can increase user convenience, such as advertising information related to nearby stores in a current location or along a route.

However, the advertising information provided by navigation devices is based on a current vehicle location or a currently set route, limiting the scope of the advertising information. Furthermore, the advertising information may not influence route selection.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a vehicle navigation device and a method for controlling the same, wherein the vehicle navigation device displays advertising data corresponding to each of multiple pieces of route data to a user before route selection, enabling the user to select a traveling route suitable for the user's plan to use an affiliated store.

The technical subjects to be achieved in an exemplary embodiment of the present disclosure may not be limited to the above-mentioned technical subjects, and other technical subjects which are not mentioned may be clearly understood, through the following descriptions, by those skilled in the art to which the present disclosure pertains.

According to an exemplary embodiment of the present disclosure, a method for controlling a navigation device may include: obtaining a destination; obtaining route information related to at least one route based on predetermined criteria from a current location to the destination; obtaining route-specific advertising information based on the route information; matching each of the at least one route with corresponding route-specific advertising information and outputting the matched route-specific advertising information; and in case that one of the at least one route is selected, performing route guidance for the selected route.

For example, the outputting of the matched route-specific advertising information may include outputting information related to each of the at least one route and the corresponding route-specific advertising information together.

For example, the outputting of the matched route-specific advertising information may be performed via a route option selection screen of the display unit.

For example, the matched route-specific advertising information may be displayed at a corresponding location on a map on the route option selection screen.

For example, the matched route-specific advertising information may be displayed with route-specific additional information on the route option selection screen.

For example, the route information may be generated by the navigation device, an advertising platform configured to provide the route-specific advertising data, or a connected car service server.

For example, the method may further include transmitting information related to the destination and the current location to an external server, wherein the obtaining of the route information may include receiving the route information from the external server.

For example, the performing of the route guidance may include, in case that a predetermined advertising output condition is satisfied, outputting advertising information corresponding to the satisfied advertising output condition among route-specific advertising information corresponding to the selected route.

For example, the predetermined advertising output condition may be satisfied in case that the current location is within a predetermined distance from a place corresponding to one piece of the route-specific advertising information, or in case that the corresponding place is positioned within a map displayed via a display unit.

For example, the obtaining of the route-specific advertising information may include obtaining the route-specific advertising information from an advertising platform, or obtaining the route-specific advertising information from the advertising platform via a connected car service server.

Furthermore, according to an exemplary embodiment of the present disclosure, a navigation device may include: a communication unit; a display unit; and a controller operably connected to the communication unit and the display unit and configured to obtain, in case that a destination is obtained, route information related to at least one route based on predetermined criteria from a current location to the destination, match each of the at least one route with corresponding route-specific advertising information, in case that route-specific advertising information is obtained based on the route information via the communication unit, and output the matched route-specific advertising information via the display unit, and in case that one of the at least one route is selected, perform route guidance for the selected route.

For example, the controller may be configured to control information related to each of the at least one route and the corresponding route-specific advertising information to be output together.

For example, the outputting of the matched route-specific advertising information may be performed via a route option selection screen of the display unit.

For example, the matched route-specific advertising information may be displayed at a corresponding location on a map on the route option selection screen.

For example, the matched route-specific advertising information may be displayed with route-specific additional information on the route option selection screen.

For example, the route information may be generated by the navigation device, an advertising platform configured to provide the route-specific advertising data, or a connected car service server.

For example, the controller may be configured to control the communication unit to: transmit information related to the destination and the current location to an external server; and receive the route information from the external server.

For example, the controller may be configured to control the display unit to output, in case that a predetermined advertising output condition is satisfied, advertising information corresponding to the satisfied advertising output condition among route-specific advertising information corresponding to the selected route.

For example, the predetermined advertising output condition may be satisfied in case that the current location is within a certain distance from a place corresponding to one piece of the route-specific advertising information, or in case that the corresponding place is positioned within a map displayed via the display unit.

For example, the route-specific advertising information may be obtained from an advertising platform configured to provide the route-specific advertising information, or obtained from the advertising platform via a connected car service server.

According to an exemplary embodiment of the present disclosure, the vehicle navigation device and the method for controlling the same, advertising data corresponding to each of multiple pieces of route data may be displayed to a user in advance of route selection, enabling the user to select a traveling route suitable for the user's plan to use an affiliated store.

Advantageous effects obtainable from the present disclosure may not be limited to the above-mentioned effects, and other effects which are not mentioned may be clearly understood, through the following descriptions, by those skilled in the art to which the present disclosure pertains.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

BRIEF DESCRIPTION OF THE DRAWINGS

FIG. 2A is a flowchart illustrating one example of a route-specific advertising display method according to an exemplary embodiment of the present disclosure.

FIG. 2B is a flowchart illustrating another example of a route-specific advertising display method according to an exemplary embodiment of the present disclosure.

Figure 1:
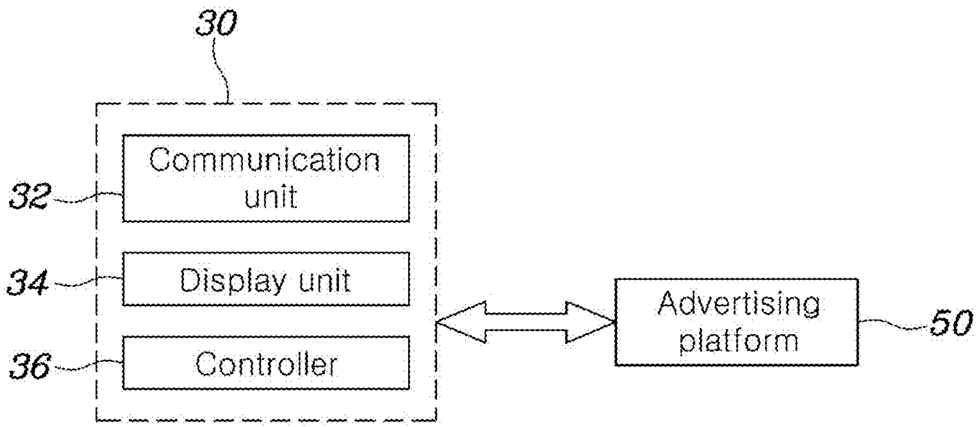
FIG. 1 is a block diagram illustrating an advertising system including a vehicle navigation device according to an exemplary embodiment of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent portions of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, various exemplary embodiments set forth in the present specification will be described in detail with reference to the accompanying drawings, and the same or similar elements are provided the same and similar reference numerals, so duplicate descriptions thereof will be omitted.

The terms "module" and "unit" used for the elements in the following description are provided or interchangeably used in consideration of only the ease of writing the specification, and do not have distinct meanings or roles by themselves.

In describing the exemplary embodiments set forth herein, a detailed description of known functions or configurations incorporated herein will be omitted when it is determined that the description may make the subject matter of the present disclosure unclear. Furthermore, the accompanying drawings are provided only for easy understanding of the exemplary embodiments disclosed in the present specification, and the technical spirit disclosed herein is not limited to the accompanying drawings, and it should be understood that all changes, equivalents, or substitutes thereof are included in the spirit and scope of the present disclosure. Terms including an ordinal number such as "first", "second", or the like may be used to describe various elements, but the elements are not limited to the terms.

These terms are used merely to distinguish between one element and any other element.

In the case where an element is referred to as being "connected" or "coupled" to any other elements, it should be understood that another element may be provided therebetween, as well as that the element may be directly connected or coupled to the other elements. In contrast, in the case where an element is "directly connected" or "directly coupled" to any other element, it should be understood that there is no other element is present therebetween.

A singular expression may include a plural expression unless they are definitely different in a context.

As used herein, the expression "comprise", "include" or "have" are intended to specify the existence of mentioned features, numbers, steps, operations, elements, components, or combinations thereof, and should be construed as not precluding the possible existence or addition of one or more other features, numbers, steps, operations, elements, components, or combinations thereof.

A unit or a control unit included in names such as a motor control unit (MCU) and a hybrid control unit (HCU) is merely a term widely used for naming a controller configured to control a specific function of a vehicle, but does not mean a generic function unit.

A controller may include a communication device configured to communicates with other controllers or sensors to control functions in charge, a memory configured to stores an operation system or logic instructions and input/output information, and the like, and one or more processors configured to perform determinations, calculations, decisions, and the like which are required for responsible function control.

An exemplary embodiment of the present disclosure proposes to display advertising data corresponding to each of multiple pieces of route data to a user, enabling the user to select a traveling route suitable for the user's plan to use an affiliated store.

FIG. 1 is a block diagram illustrating an advertising system including a vehicle navigation device according to an exemplary embodiment of the present disclosure.

FIG. 1 illustrates elements related to the exemplary embodiment, but in the actual implementation of a vehicle navigation device and an advertising system using the same, fewer or more elements may be included.

As illustrated in FIG. 1, a vehicle navigation device 30 may include a communication unit 32 configured to perform data exchange with an advertising platform 50, a display unit 34 for displaying an image, and a controller 36 configured to match a corresponding advertising data with each of one or more routes from a current location to a destination of the vehicle and control the matched advertising data to be output via the display unit 34. Generally, the navigation device 30 may operate on GPS (Global Positioning System) technology. For example, a GPS receiver (not shown) precisely determines the current location using satellite signals. Subsequently, the navigation device 30 may plan a route to the destination and displays efficient paths, turn-by-turn directions, and instructions either visually on the display unit 34 or through voice prompts to the driver.

Hereinafter, each of the elements 32, 34, and 36 of the navigation device 30 will be described in more detail.

The communication unit 32 may perform data exchange with the advertising platform 50 through a wireless connection. The wireless connection to the advertising system 50 may be performed through a wireless communication protocol such as Long Term Evolution (LTE) (3G/4G)/5G. However, this is exemplary and the present disclosure is not necessarily limited thereto.

The display unit 34 may be implemented as a display device of an Audio/Video/Navigation/Telematics (AVNT) system, but this is exemplary and the display unit 34 may be any other display unit in the vehicle, such as a display in a cluster, a head-up display (HUD), window glass, or roof glass. Depending on the implementation, the display unit 34 may be disposed in close proximity to a vehicle or may be an external display which is visible to a passenger inside the vehicle. In the instant case, the external display may be coordinated with the location of the vehicle to display advertising information or the like in close proximity to the vehicle so that the advertising information may be viewed by the passenger. As described above, the display unit 34 is not limited to any shape or arrangement location as long as the vehicle passenger can visually identify route-specific advertising data.

The controller 36 may be configured for controlling the communication unit 32 and the display unit 34 described above. When a destination is specified, the controller 36 may be configured for controlling the communication unit 32 to obtain route-specific advertising data from the advertising platform 50 before outputting route information via the display unit 34. For the advertising platform 50 to prepare the route-specific advertising data, data regarding one or more routes is required.

To the present end, the navigation device 30 may transmit route data to the advertising platform 50 when the navigation device 30 has route data, or the navigation device 30 may transmit current location and destination information of the vehicle to the advertising platform 50 when the advertising platform 50 generates route data. Here, the case where the navigation device 30 has route data may be a case in which the navigation device 30 has generated one or more routes on its own based on predetermined criteria (e.g., shortest time, optimal route, shortest distance, highway preference, etc.) by use of map data that the navigation device 30 has, and may include a case in which the navigation device 30 transmits a current location and a destination of the vehicle to a connected car service (CCS) server and receives one or more pieces of route information in response thereto. Furthermore, the case in which the advertising platform 50 generates route data may be a case in which the advertising platform 50 is implemented as a function of the CCS server that generates the route data. On the other hand, when the CCS server is implemented separately as different operating entity from the advertising platform 50, the CCS server may transmit route information generated thereby to the advertising platform 50, receive route-specific advertising information from the advertising platform 50, and then transmit the route-specific advertising information and the route information to the navigation device 30.

When both the one or more pieces of route information and the route-specific advertising information are obtained, the controller 36 may be configured for controlling each piece of route information and advertising information corresponding thereto to be matched and output via the display unit 34 in a predetermined form. The predetermined form may be a route option selection screen which enables the selection of a route to be guided through the navigation device 30 while displaying information related to each of the one or more routes on a map that includes an area between the current location and the destination. However, this is exemplary and the present disclosure is not limited thereto.

specific examples of the route option selection screen will be described in more detail with reference to FIG. 3A and FIG. 3B.

When the route information and the route-specific advertising information matched thereto are output together as described above, a user can know a place (i.e., an advertising affiliated store) through which the user can pass along each route through advertising information, in addition to usual route selection criteria (e.g., shortest time, optimal route, shortest distance, highway preference, etc.), and can thus select routes even in consideration of the user's plan to use the affiliated store.

When one of routes matched with advertising information is selected by the user (a driver or a vehicle passenger), route guidance according to the selected route may be performed by the navigation device 30. When a predetermined advertising output condition is satisfied, such as when a place corresponding to advertising information is included in a currently displayed map or is within a predetermined distance from a current location, the advertising information may be output via the display unit 34. A specific form of outputting the advertisement information will be described late with reference to FIG. 4.

To perform the above-described functions, the controller 36 may include a memory for storing an operating system or logic instructions and input/output information, and the like, and one or more processors for performing determination, computation, decision-making, and the like necessary for controlling assigned functions.

A method for controlling the navigation device 30 according to an exemplary embodiment will be described based on the above-described vehicle navigation device configuration with reference to FIG. 2A and FIG. 2B.

Figure 2A:
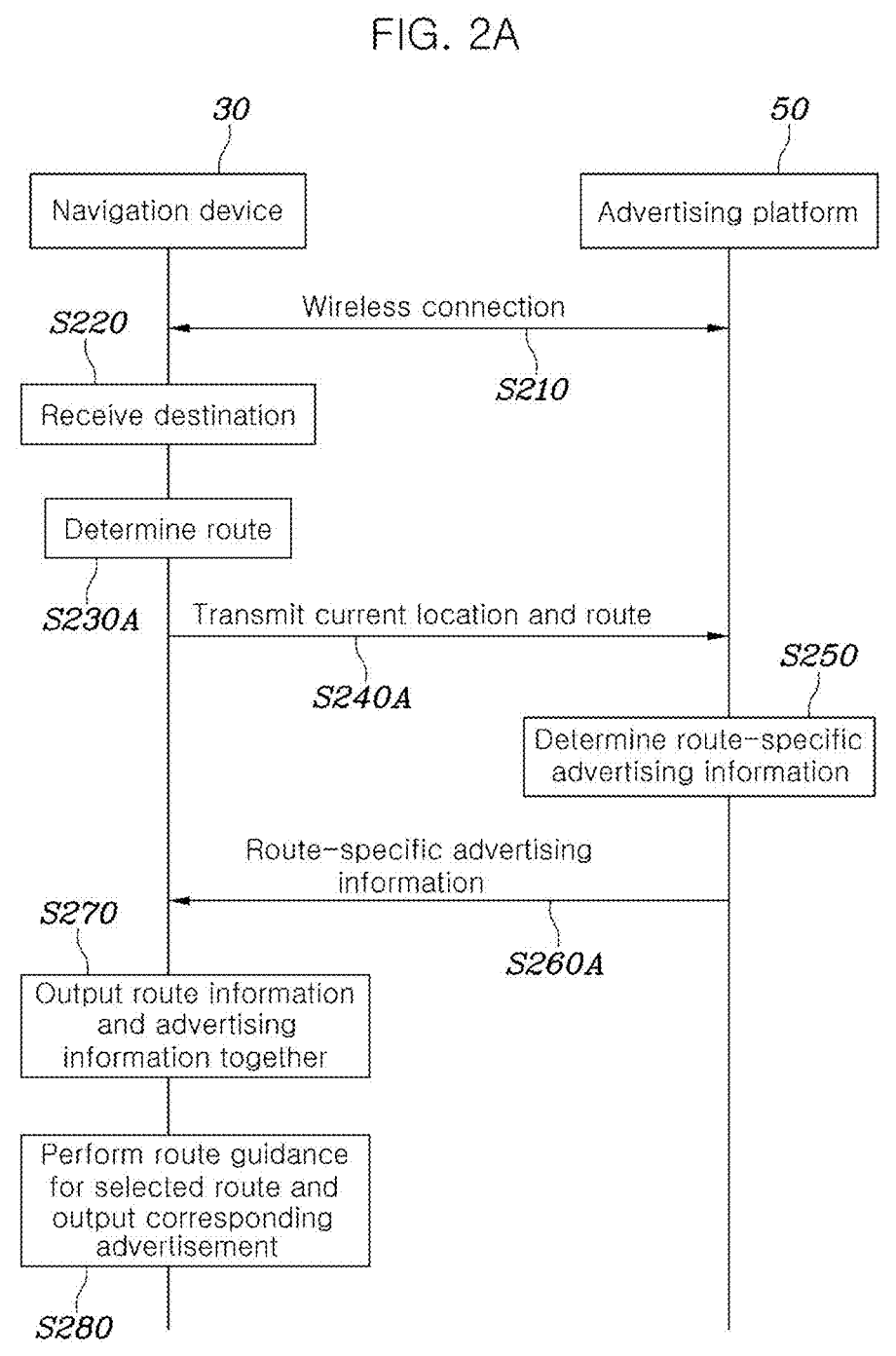

FIG. 2A is a flowchart illustrating one example of a route-specific advertising display method according to an exemplary embodiment of the present disclosure.

Referring to FIG. 2A, a wireless connection may first be established between the navigation device 30 and the advertising platform 50 (S210).

Accordingly, when a destination is input into the navigation device 30 (S220), the navigation device 30 may be configured to determine a route from a current location to the destination (S230A). Here, the navigation device may be configured to determine one or more routes based on predetermined criteria (e.g., shortest time, optimal route, shortest distance, highway preference, free road preference, etc.). The determined routes may be the same even with different criteria, or may be different depending on the criteria. According to an exemplary embodiment of the present disclosure, when a CCS server is used for route determination, the navigation device 30 may transmit the current location and destination information to the CCS server and receive information related to one or more routes from the CCS server.

When the one or more routes are determined, the navigation device 30 may transmit information related to routes between the current location and the destination to the advertising platform 50 (S240A), and the advertising platform 50 may be configured to determine advertising information corresponding to each route (S250). For example, the advertising platform 50 may be configured to determine that advertising information corresponding to an affiliated store located within a certain distance for each route, among pre-stored advertising information related to each affiliate store is advertising information for the route. However, this is exemplary, and various criteria, such as an affiliated store rating, a traveling history of a vehicle provided with the navigation device 30, etc., other than the distance, may be applied to the selection.

The advertising platform 50 may transmit the determined route-specific advertising information to the navigation device 30 (S260A), and the navigation device 30 may match the route-specific advertising information to the route information and output the route-specific advertising information and the route information together via the output portion 34 (S270). As described above, the route-specific advertising information may be output on a route option selection screen.

When a user selects one of the output routes, route guidance according to the selected route is performed by the navigation device 30, and when a predetermined output condition is satisfied during the route guidance, advertising information corresponding thereto may be output (S280). As described above, the predetermined output condition may be if a place corresponding to advertising information is included in a currently displayed map or is within a predetermined distance from a current location. However, this is exemplary and the present disclosure is not necessarily limited thereto.

FIG. 2A illustrates that the navigation device 30 exchange data directly with the advertising platform 50. However, in an actual implementation, there may be another network entity (e.g., a CCS server) that relays bilateral data exchange between the navigation device 30 and the advertising platform 50.

Figure 2B:
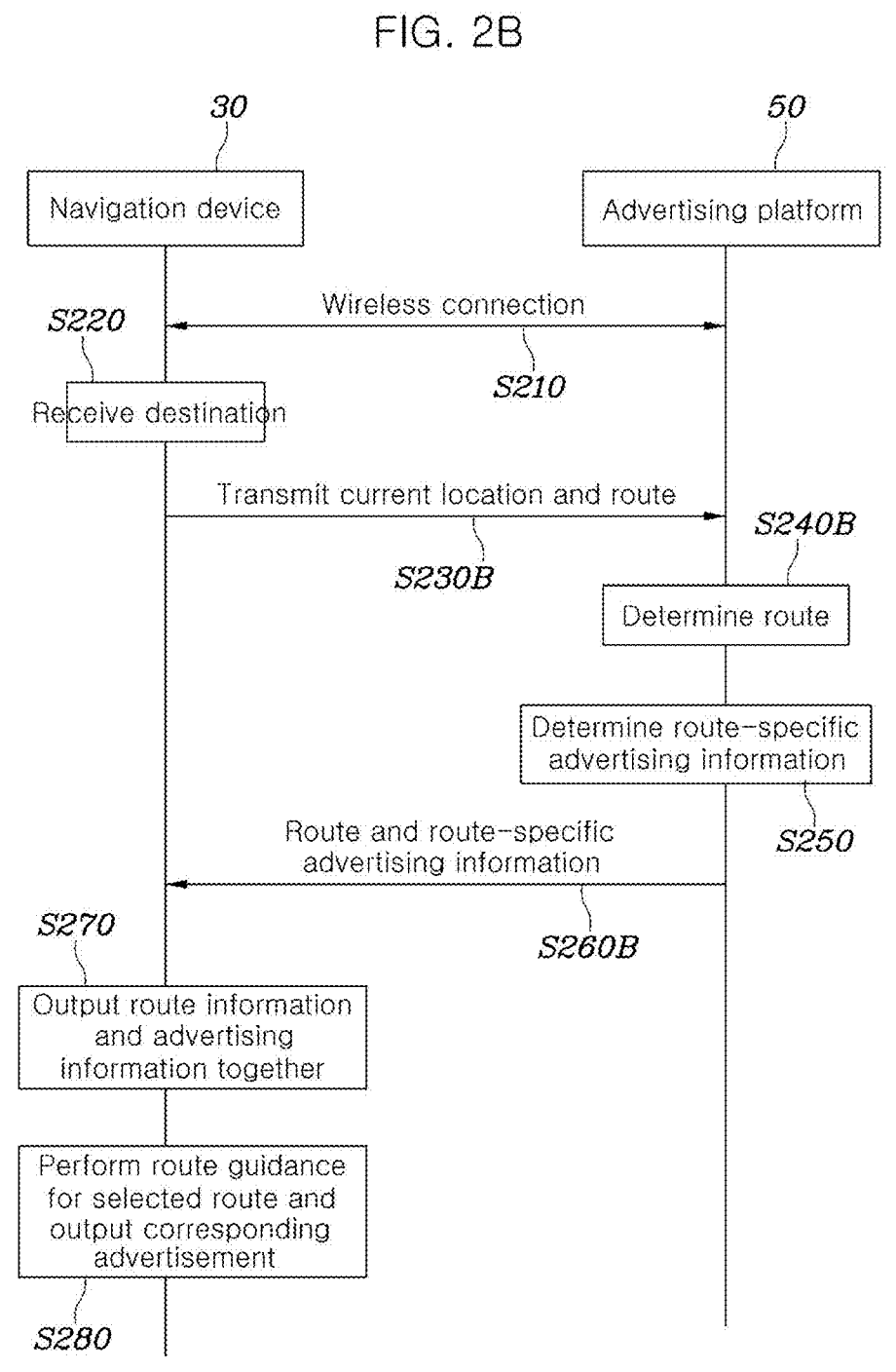

FIG. 2B is a flowchart illustrating another example of a route-specific advertising display method according to an exemplary embodiment of the present disclosure. In FIG. 2B, unlike FIG. 2A, it is assumed that the advertising platform 50 includes a route determination function, for example, is implemented as a function of a CCS server.

In FIG. 2B, operations S210 and S220 are the same as the corresponding operations in FIG. 2A, and therefore, redundant description will be omitted.

Accordingly, when a destination is input into the navigation device 30 (S220), the navigation device 30 may transmit current location and destination information to the advertising platform 50 (S230B).

The advertising platform 50 may be configured to determine one or more routes based on predetermined criteria (e.g., shortest time, optimal route, shortest distance, highway preference, free road preference, etc.) (S240B). The determined routes may be the same even with different criteria, or may be different depending on the criteria. According to an exemplary embodiment of the present disclosure, when a separate CCS server is used for route determination, the advertising platform 50 may transmit the current location and destination information to the CCS server and receive information related to one or more routes from the CCS server.

When the one or more routes are determined, the advertising platform 50 may be configured to determine advertising information corresponding to each route (S250). For example, the advertising platform 50 may be configured to determine that advertising information corresponding to an affiliated store located within a certain distance for each route, among pre-stored advertising information related to each affiliate store is advertising information for the route. However, this is exemplary, and various criteria, such as an affiliated store rating, a traveling history of a vehicle provided with the navigation device 30, etc., other than the distance, may be applied to the selection.

The advertising platform 50 may transmit the determined route-specific advertising information to the navigation device 30 together with route information (S260B), and the navigation device 30 may match the route-specific advertising information to the route information and output the route-specific advertising information and the route information together via the output portion 34 (S270). As described above, the route-specific advertising information may be output on a route option selection screen.

When a user selects one of the output routes, route guidance according to the selected route is performed by the navigation device 30, and when a predetermined output condition is satisfied during the route guidance, advertising information corresponding thereto may be output (S280).

As described above, the predetermined output condition may be when a place corresponding to advertising information is included in a currently displayed map or is within a predetermined distance from a current location. However, this is exemplary and the present disclosure is not necessarily limited thereto.

According to another exemplary embodiment of the present disclosure, in FIG. 2B, the advertising platform 50 may be replaced by a CCS server, and operation S250 may be replaced by operation of receiving route-specific advertising information from the advertising platform 50 in response to route information which the CCS server provides to the advertising platform 50. That is, with the present configuration replacement, the navigation device 30 may transmit the current location and the destination to the CCS server, the CCS server may be configured to determine the route information based on the current location and the destination, and then the CCS server may request the advertising platform 50 for route-specific advertising information, based on the route information. The CCS server having obtained the route-specific advertising information may provide the route-specific advertising information to the navigation device 30 together with the route information.

Next, specific examples in which advertising information is provided via a route option selection menu before route guidance will be described with reference to FIG. 3A and FIG. 3B. The states of the display unit 34 illustrated in FIG. 3A and FIG. 3B may correspond to the route option selection menus output in operations S270 in FIG. 2A and FIG. 2B.

Figure 3A:
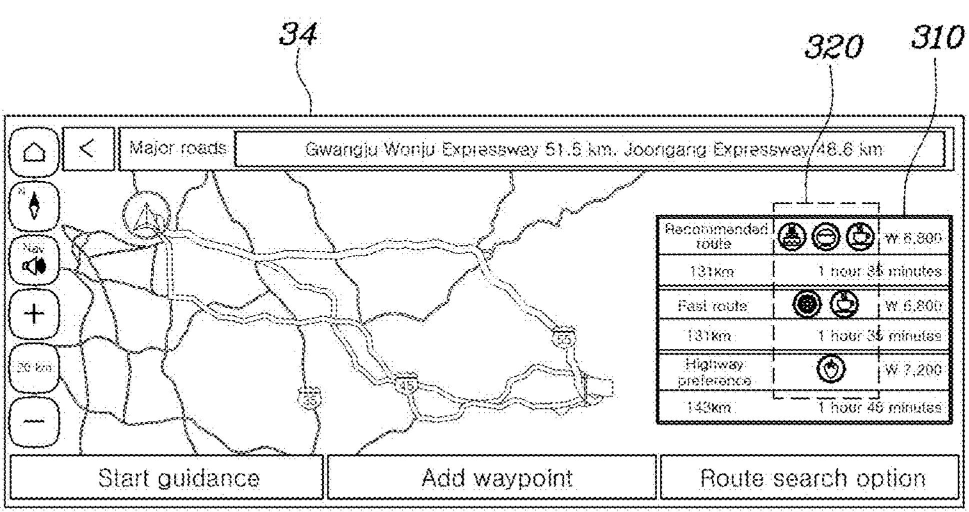
FIG. 3A illustrates an example in which route-specific advertising information is provided before route guidance according to an exemplary embodiment of the present disclosure.

FIG. 3A illustrates an example in which route-specific advertising information is provided before route guidance according to an exemplary embodiment of the present disclosure.

Referring to FIG. 3A, three route options, i.e., a recommended route, a fast route, and a highway-preference route, are provided between a current location and a destination together with a map. One side area 310 of the display unit 34 may be provided with icons 320 corresponding to advertising information, together with additional information such as distance, duration, and toll road charge per route. Thus, in addition to the information such as distance, duration, and toll charge, which are typically referenced in route selection, the user can also identify the category of stores present along the routes through the icons 320 and use the category as a reference for route selection.

Figure 3B:
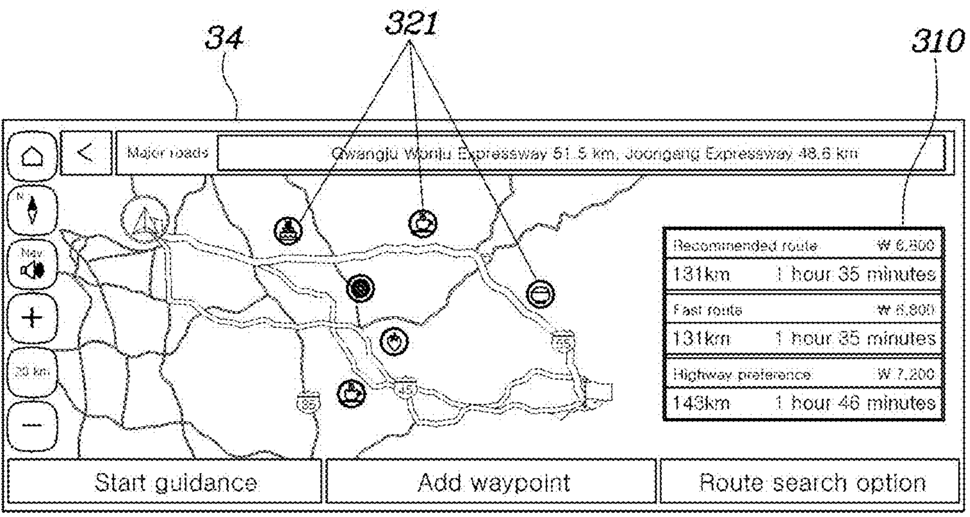
FIG. 3B illustrates another example in which route-specific advertising information is provided before route guidance according to an exemplary embodiment of the present disclosure.

FIG. 3B illustrates another example in which route-specific advertising information is provided before route guidance according to an exemplary embodiment of the present disclosure.

Referring to FIG. 3B, unlike FIG. 3A, icons 321 may be displayed at the actual locations of stores corresponding to route-specific advertising information, instead of one side area 310 in which route-specific additional information is displayed.

Figure 4:
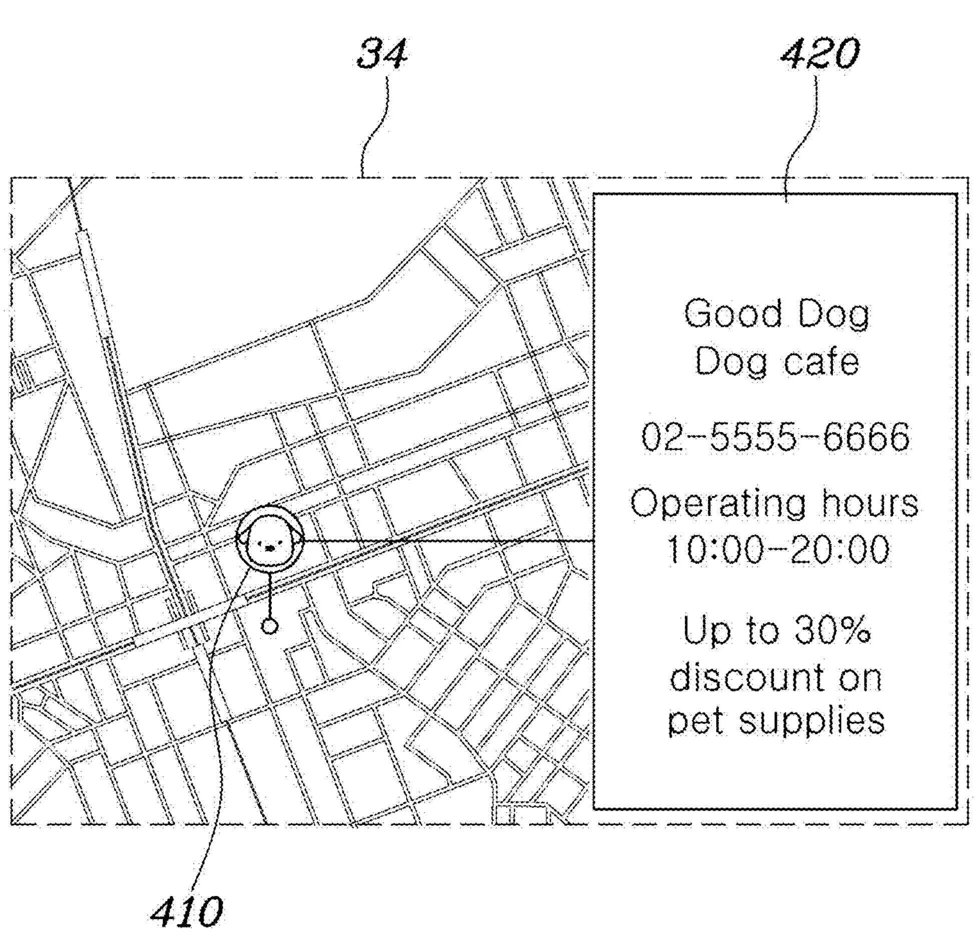
FIG. 4 illustrates an example in which advertising information is output via a display unit according to an exemplary embodiment of the present disclosure.

FIG. 4 illustrates an example in which advertising information is output via a display unit according to an exemplary embodiment of the present disclosure. In FIG. 4, it is assumed that advertising information is provided via the display unit 34 during route guidance in operation S280 in FIG. 2A and FIG. 2B.

Referring to FIG. 4, advertising information may be in a form of a brand pin 410 positioned on a map displayed via the display unit 34. Additional information 420 about a store corresponding to the brand pin 410 may optionally further be displayed together with the brand pin 410. The additional information 420 may include information such as the store's name, operating hours, and discount information. The present additional information may enhance the convenience of customers' visit to the store while effectively attracting the customers.

According to the exemplary embodiments of the present disclosure described above, advertising data corresponding to each of multiple pieces of route data may be displayed to a user, enabling a user to select a traveling route suitable for the user's plan to use an affiliated store.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may be configured to process data according to a program provided from the memory, and may be configured to generate a control signal according to the processing result.

The control device may be at least one microprocessor operated by a predetermined program which may include a series of commands for carrying out the method included in the aforementioned various exemplary embodiments of the present disclosure.

The aforementioned disclosure can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the memory and the processor may be provided as one chip, or provided as separate chips.

In various exemplary embodiments of the present disclosure, the scope of the present disclosure includes software or machine-executable commands (e.g., an operating system, an application, firmware, a program, etc.) for enabling operations according to the methods of various embodiments to be executed on an apparatus or a computer, a non-transitory computer-readable medium including such software or commands stored thereon and executable on the apparatus or the computer.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The term "and/or" may include a combination of a plurality of related listed items or any of a plurality of related listed items. For example, "A and/or B" includes all three cases such as "A", "B", and "A and B".

In the present specification, unless stated otherwise, a singular expression includes a plural expression unless the context clearly indicates otherwise.

In exemplary embodiments of the present disclosure, "at least one of A and B" may refer to "at least one of A or B" or "at least one of combinations of at least one of A and B". Furthermore, "one or more of A and B" may refer to "one or more of A or B" or "one or more of combinations of one or more of A and B".

In the exemplary embodiment of the present disclosure, it should be understood that a term such as "include" or "have" is directed to designate that the features, numbers, steps, operations, elements, parts, or combinations thereof described in the specification are present, and does not preclude the possibility of addition or presence of one or more other features, numbers, steps, operations, elements, parts, or combinations thereof.

Hereinafter, the fact that pieces of hardware are coupled operably may include the fact that a direct and/or indirect connection between the pieces of hardware is established by wired and/or wirelessly.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A method for controlling a navigation device, the method comprising:

obtaining, by a controller, a destination;

obtaining, by the controller, route information related to a plurality of routes based on different predetermined criteria from a current location to the destination;

prior to user selection of any route, obtaining, by the controller, route-specific advertising information based on the route information;

matching, by the controller, each of the plurality of routes with corresponding route-specific advertising information and outputting the matched route-specific advertising information to enable route selection based on the advertising information; and in response that one of the plurality of routes is selected, performing, by the controller, route guidance for the selected route.

2. The method of claim 1, wherein the outputting of the matched route-specific advertising information includes outputting information related to each of the plurality of routes and the corresponding route-specific advertising information together.

3. The method of claim 2, wherein the outputting of the matched route-specific advertising information is performed via a route option selection screen of a display unit operably connected to the controller.

4. The method of claim 3, wherein the matched route-specific advertising information is displayed at a corresponding location on a map on the route option selection screen.

5. The method of claim 3, wherein the matched route-specific advertising information is displayed with route-specific additional information on the route option selection screen.

6. The method of claim 1, wherein the route information is generated by the navigation device, an advertising platform configured to provide the route-specific advertising data, or a connected car service server.

7. The method of claim 1, further including:

transmitting, by the controller, information related to the destination and the current location to an external server, wherein the obtaining of the route information includes receiving the route information from the external server.

8. The method of claim 1, wherein the performing of the route guidance includes:

in response that a predetermined advertising output condition is satisfied, outputting advertising information corresponding to the satisfied advertising output condition among route-specific advertising information corresponding to the selected route.

9. The method of claim 8, wherein the predetermined advertising output condition is satisfied in response that the current location is within a predetermined distance from a place corresponding to one piece of the route-specific advertising information, or in response that the corresponding place is positioned within a map displayed via a display unit.

10. The method of claim 1, wherein the obtaining of the route-specific advertising information includes obtaining the route-specific advertising information from an advertising platform, or obtaining the route-specific advertising information from the advertising platform via a connected car service server.

11. A navigation apparatus comprising:

a communication unit;

a display unit; and a controller operably connected to the communication unit and the display unit and configured to:

obtain, in response that a destination is obtained, route information related to a plurality of routes based on different predetermined criteria from a current location to the destination;

prior to user selection of any route, match each of the plurality of routes with corresponding route-specific advertising information, in response that route-specific advertising information is obtained based on the route information via the communication unit, and output the matched route-specific advertising information via the display unit to enable route selection based on the advertising information; and in response that one of the plurality of routes is selected, perform route guidance for the selected route.

12. The navigation apparatus of claim 11, wherein the controller is further configured to control information related to each of the plurality of routes and the corresponding route-specific advertising information to be output together.

13. The navigation apparatus of claim 12, wherein the outputting of the matched route-specific advertising information is performed via a route option selection screen of the display unit.

14. The navigation apparatus of claim 13, wherein the matched route-specific advertising information is displayed at a corresponding location on a map on the route option selection screen.

15. The navigation apparatus of claim 13, wherein the matched route-specific advertising information is displayed with route-specific additional information on the route option selection screen.

16. The navigation apparatus of claim 11, wherein the route information is generated by the navigation apparatus, an advertising platform configured to provide the route-specific advertising data, or a connected car service server.

17. The navigation apparatus of claim 11, wherein the controller is further configured to control the communication unit to transmit information related to the destination and the current location to an external server and receive the route information from the external server.

18. The navigation apparatus of claim 11, wherein the controller is further configured to control the display unit to output, in response that a predetermined advertising output condition is satisfied, advertising information corresponding to the satisfied advertising output condition among route-specific advertising information corresponding to the selected route.

19. The navigation apparatus of claim 18, wherein the predetermined advertising output condition is satisfied in response that the current location is within a predetermined distance from a place corresponding to one piece of the route-specific advertising information, or in response that the corresponding place is positioned within a map displayed via the display unit.

20. The navigation apparatus of claim 11, wherein the route-specific advertising information is obtained from an advertising platform configured to provide the route-specific advertising information, or obtained from the advertising platform via a connected car service server.

* * * * *